Feb. 14, 1956  G. LOMBARDI  2,734,499
CHARCOAL BROILER
Filed June 9, 1954
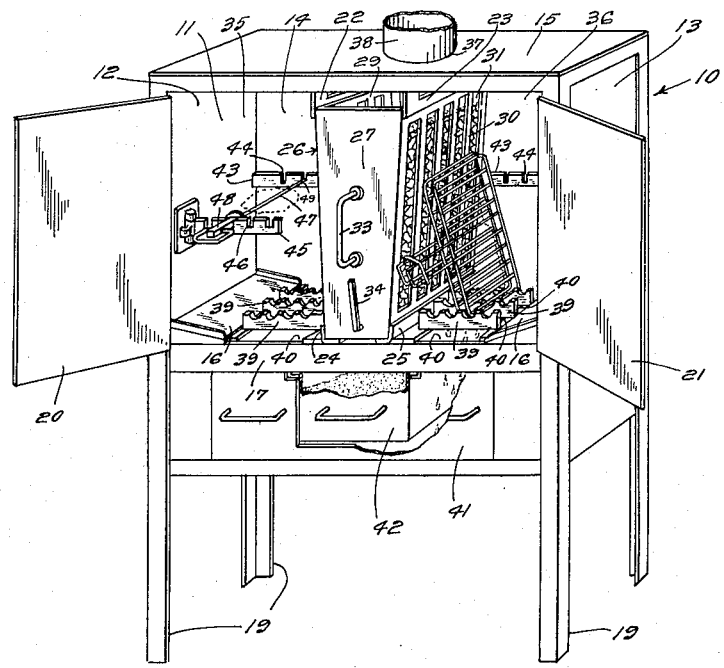
Fig. 1
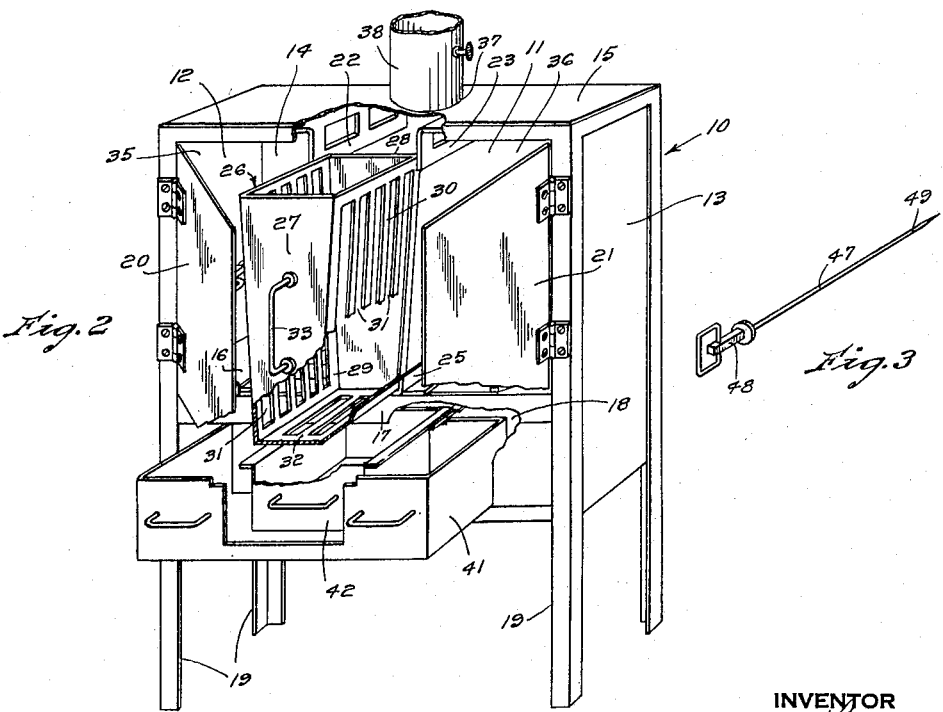
Fig. 2
Fig. 3
INVENTOR
Giuseppe Lombardi
BY
Nathaniel Fruchs
ATTORNEY

United States Patent Office 2,734,499
Patented Feb. 14, 1956

2,734,499

CHARCOAL BROILER

Giuseppe Lombardi, West Warwick, R. I.

Application June 9, 1954, Serial No. 435,423

5 Claims. (Cl. 126—25)

The present invention relates to charcoal broilers and the like and has special reference to a novel construction for an oven type broiler.

The principal object of the invention is to provide a compact charcoal broiler of enclosed type.

Another object of the invention is to provide a charcoal broiler construction which distributes the heat evenly over all parts of the food being broiled.

A further object of the invention is to provide a charcoal broiler having a detachably mounted internal fire box.

An additional object of the invention is to provide a charcoal broiler construction having removable ash and drip collecting pans.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a perspective view of an illustrative charcoal broiler embodying the invention, parts broken away, the doors being open;

Fig. 2 is a view similar to Fig. 1, the doors being partly closed, and the pans and fire box being slidably pulled out; and Fig. 3 is a perspective view of a spit for use with the broiler.

It has been found advantageous to provide a charcoal broiler construction with an oven having an internal V-shaped fire box slidably mounted therein, whereby the heat is distributed evenly over the food and having slidably mounted ash and drip pans. To this end, I provide an upright metallic cabinet with an upper oven chamber having a fire box, a floor with openings separating the oven chamber from a lower section equipped with an ash pan under the fire box and a drip pan under the floor for collecting the drippings passing through the floor openings.

Referring to the drawings, Fig. 1 illustrates a preferred embodiment of my novel charcoal broiler 10 comprising an upper metallic oven chamber 11 having sides 12, 13, a back 14, a top 15 and floor sections 16 supported by a front support bar 17 and a similar parallel rear bar, not shown, and a lower chamber 18, the oven chamber being supported on legs 19. Doors 20, 21 are swingingly attached to the front of the chamber, whereby the oven may be closed.

The oven chamber has two parallel spaced upper runners 22, 23 depending from the top 15, and two parallel spaced lower runners 24, 25 upstanding from the support bars, whereby a fire box 26 having a metallic front 27, a metallic rear 28, inwardly downwardly converging grate sides 29, 30, with a plurality of slits 31, and a grate bottom 32, is slidably mounted between the upper and lower runners. A handle 33 on the front 27 for grasping the fire box, and an agitator 34 for shaking out the ashes, are also provided, the fire box dividing the oven chamber into two broiling compartments 35, 36.

The top 15 has an opening 37 through which a smoke-pipe 38 extends leading from the top of the fire box, whereby the fire box and the broiling compartments may be vented. The floor sections 16 support upstanding notched cross bars 39, and are slanted contiguous the sides 12, 13 against which they are wedged, as illustrated, the notched cross bars being spaced to provide openings 40 therebetween, whereby the drippings are collected in a drip pan 41, which is slidably mounted below the sections 16. An ash pan 42 is slidably mounted below the grate bottom 32.

Each compartment 35, 36 has a rear brace 43 having spaced notches 44 and attached to the back 14, and a side brace 45 with spaced notches 46 and hingedly secured to the sides 12, 13 for swinging movement against the sides, whereby a spit 47, see Fig. 3, may be rotatably positioned within aligned rear and side brace notches. The spit 47 has a handle portion 48 having a square cross section adapted to be selectively positioned in the aligned brace notches, whereby meat speared on the spit end 49 may be fixed against the fire box in any desired position.

My novel construction thus provides a broiler with an enclosed fire box, for direct rapid broiling of meats, fowl or fish.

The V-shaped fire box permits a close positioning of the food to the fire box sides, and the enclosed oven construction concentrates heat on that portion of the food not directly facing the hot charcoal so that an even distribution of the heat is obtained. The spaced upstanding notched grates of the oven provide channels for the drippings and eliminates smoking within the oven, the drippings being separated from the hot ashes which are collected in the separate ash pan.

Although I have disclosed a specific constructional arrangement of my invention, it is obvious that changes in the size, shape and arrangement of the parts may be made without departing from the spirit and the scope of the invention, as defined in the appended claims.

I claim:

1. A broiler construction comprising an upper oven chamber having sides, a back, and a top, and a lower chamber below the oven chamber, front and rear support bars between said chambers, two parallel spaced upper runners depending from the oven chamber top and two parallel spaced lower runners upstanding from the support bars, said runners extending from the front to the back, a fire box having a front, a rear, grate sides, and a grate bottom slidably mounted between the upper and lower runners and providing two spaced broiling compartments between the fire box and the housing sides, floor sections on the sides of the fire box spaced from the fire box and supported on the support bars, and spaced cross bars on each side extending from the lower runners to the floor sections.

2. In the combination of claim 1, said fire box grate sides converging downwardly.

3. In the combination of claim 2, said floor section being inclined downwardly towards the fire box.

4. In the combination of claim 3, said oven chamber having hinged closure doors.

5. In the combination of claim 1, said lower chamber including an ash pan slidably mounted beneath the fire box and a removable drip pan positioned to receive drippings from between the spaced cross bars.

References Cited in the file of this patent

UNITED STATES PATENTS

| 716,501 | Watson | Dec. 23, 1902 |
|---------|--------|---------------|
| 1,656,181 | Elbert | Jan. 17, 1928 |
| 2,201,756 | Avetta | May 21, 1940 |

FOREIGN PATENTS

| 4,298 | Great Britain | Mar. 19, 1915 |